Oct. 23, 1945. P. W. ABELES 2,387,487
CONSTRUCTION OF PITCHED ROOFS
Filed Nov. 13, 1943

Inventor
PAUL W. ABELES,
By John E. Eastlack
Attorney

Patented Oct. 23, 1945

2,387,487

UNITED STATES PATENT OFFICE 2,387,487

CONSTRUCTION OF PITCHED ROOFS

Paul William Abeles, London, England

Application November 13, 1943, Serial No. 510,176
In Great Britain November 9, 1942

14 Claims. (Cl. 108—1)

This invention relates to improvements in the construction of pitched roofs.

The object of this invention is to form by molding, members which replace rafters and tiles for use for pitched roofs, said molded tile rafters being formed from a plastic, non-metallic substance, which may be reinforced with steel, and produced in lengths such as are usual for rafters and assembled one member beside another, each overlapping and/or interlocking with the adjacent member, thus replacing the whole roofing, usually consisting of timber rafters and battens (laths) and a plurality of tiles, slates or sheets.

Another object of my invention is to form said tile rafters with such a cross section as to ensure a great moment of resistance, such, for example, as a substantially half-tubular cross section having only parts of their upper and lower portions flattened and one or two flanges or extensions at the lower side so as to increase the compressive and tensile zones, or the cross section may be that of a trough, or in the shape of a trapezium open at the greater parallel side.

Another object of my invention is to provide an impermeable preferably smooth layer upon the outer surfaces of said tile rafters in order to make them resistant against the effects of weather.

Another object of my invention is to form said molded tile rafters from any of the following materials:

(a) Concrete or the like products, characterized by the fact that the plastic substance consists of a mixture of natural or artificial, preferably suitably graded aggregates of light or heavy weight, and of a binding agent such as cement lime, glue, synthetic resin or a material of similar properties, the resulting product being any of those known as concrete, light-weight concrete (of pumice, foamed slag, Haydite, cork, sawdust), artificial stone, artificial lime-stone, synthetic concrete, dry clay or dry earthenware.

(b) Brick or the like products, characterized by the fact that the molded product is burnt, the resulting products being known as brick, burnt clay or burnt earthenware.

(c) Glass or the like products, characterized by the fact that the products are molded in melted consistency and harden when cooling.

(d) Plastics or the like products, characterized by the fact that the products are molded under high pressure and heat, using synthetic resins which are either thermo-setting or thermoplastic.

(e) Asbestos or like products, characterised by the fact that they are molded under pressure, using fibrous material at least in part.

Special steel reinforcement may be provided where necessary to increase the tensile resistance.

Another object of my invention is to use preferably light weight materials for the formation of said tile rafters in order, on the one hand, to reduce their weight, thus simplifying transport and handling, and on the other hand, to increase their insulating value.

Another object of my invention, in an alternative embodiment thereof, is to form such tile rafters of substantially half-cylindrical shape from concrete by centrifugal molding, thus ensuring great density and strength and a smooth impermeable surface which is obtained by the centrifugal spinning process, two half-tubes being produced simultaneously.

Another object of my invention is to form a pitched roof by the assembly of a number of said tile rafters laid one beside another and overlapping and/or interlocking with each other, said tile rafters being supported by, secured to, and if required, also interlocking with, eave members in a solid top floor construction of a house, ties in said solid floor taking up the thrust occurring through the pitched roof, separate preferably I-shaped ridge members being provided with which said sloping tile rafters interlock. A roof thus formed differs from the usual type of pitched roofs in that there is no separate roof framework having in addition purlins and rafters, nor a roofing cover consisting of tiles, slates or sheets fixed to battens secured to the rafters transversely thereto, the tile rafters according to my invention replacing both framework and roofing cover. The separate ridge members can also be dispensed with, in which case the corresponding tile rafters abut each other at the ridge, where they have cross ribs provided.

Another object of my invention in a further alternative embodiment is to provide separate eave members to which the tile rafters are secured, said separate eave members being provided when no separate solid top floor construction is provided, and the thrust of the pitched roof being taken up by separate ties arranged between the said eave members, which have sufficient strength as beams to take up the horizontal thrust between the ties. The tile rafters may be secured to the eave beams either in recesses or in extending parts. In the latter case it is possible to provide the tile rafters at their lower ends with ribs extending across, in which case only the cross ribs abut against protruding parts of the eave members.

Another object of my invention in a still further alternative embodiment thereof, in the construction of a pitched roof is to assemble together a number of my tile rafters laid one beside another, overlapping and/or interlocking with each other, said tile rafters being secured to the eave, the ridge member and intermediate purlins, separately supported, this arrangement being suitable when the sloping side of the pitched roof between eave and ridge is of such length (say over 20 feet) that single tile rafters of equivalent length would have to be of great depth and consequently of undesirably great weight in order to provide sufficient resistance against bending.

Pitched roofs are used where owing to great rain fall and snow such a construction is considered to be more advantageous than flat roofs which are mainly employed in houses in more sunny countries where the flat roof is used by the inhabitants of the houses. Although it is possible to build also solid flat roofs capable of withstanding the influences of bad weather, the pitched roof has been preferred in many districts both from traditional reasons and from the aesthetic point of view. Pitched roofs are commonly formed from a timber frame work comprising generally a roof truss, horizontal purlins and sloping rafters, and from a roof covering consisting of a plurality of tiles, slates or sheets fixed to battens, which latter are secured to the rafters. The roof truss, purlins, rafters and battens, in normal dwelling house construction, are of timber. Such construction which has been practised since ancient times is relatively uneconomic, since it involves the application of skilled labour to a very great extent and the use of such labour under the difficulties inherent in working upon the sloping surface of the roof. Some improvement has been achieved by the employment of larger single elements in the covering of roofs such as corrugated metal or asbestos sheets. However, even with such improved constructions the erection of the roof is relatively complicated, since it requires both the carpenter and the tiler, slater or roofer to do their job on the site. Even if the roof trusses were assembled in the work shop or on the ground at the site and erected as one unit, and even if it were possible to assemble purlins, rafters and battens inclusive of fixing all the roofing cover for a whole sloping part of a roof, the assembly would involve the application of much skilled labour for fixing the great number of tiles to the battens, in addition to the work necessary to produce the great number of units for the outer skin or cover of the roof.

My invention is intended to overcome these disadvantages of the traditional methods of constructing pitched roofs, by forming tiles of such a cross section that the moment of resistance is substantially enhanced as compared with traditional sections as in pan tiles, corrugated sheets or the like and that a roofing member of considerable length is provided capable of resisting the loading occurring when in use. Such a construction is thus able to replace rafters and roof cover, and in addition with other members even the roof trusses, the assembly being thus greatly simplified and the labour costs reduced.

According to my invention it is possible to produce such roofing members suitable for pitched roofs of about 20 ft. span (the sloping length being about 13 ft.) having a width of about 1 ft. and a weight about 200 lbs., thus rendering possible their handling by two men without any mechanical devices. Assuming a pitched roof for a house 20 ft. by 20 ft. has to be erected, only 40 tile rafters have to be assembled, there also being necessary if desired a ridge member and 2 eave members, but no separate roof frame work is required, and the eave members can be dispensed with when there is a solid top floor construction existing. In a traditionally constructed roof of the same size it would be necessary to employ a timber frame work and moreover to fix to the rafters at least 20 battens of 20 ft. length (assuming a distance of 1 ft. between the battens) and to fix to the battens at least 500 tiles. This example shows the simplification possible by using my invention.

It is, of course, possible to employ the improved tile rafters according to my invention not only for pitched roof with two sloping sides but also for lean-to roofs.

It has already been known to simplify the traditional type of pitched roof, described hereinbefore, by the arrangement of purlins one beside another between the roof trusses, to which purlins the roof cover is fixed, thus dispensing with rafters and battens. It is also known to provide angular shaped tile elements parallel to the ridge instead of such purlins, which elements overlap each other and extending horizontally over the distance between the individual roof trusses. It is also known to arrange the individual roof trusses so close to each other that separate purlins, rafters and battens are dispensed with and sloping slabs overbridge horizontally the distance between the individual trusses. In an alternative of this solution the slabs are combined with halves of the rafters of the roof trusses to form channel-shaped sloping roofing members, two halves of two adjacent couples of such roofing members, abutting at the ridge, forming together with a tie a roof truss.

All these known simplifications of the traditional pitched roof consist, in principle, of a number of roof trusses and of horizontal elements overbridging the distance between the trusses, the two last mentioned constructions belonging to the so-called pitched "slab" roofs. My invention differs from these known improvements and offers further economical advantages in comparison with them. According to my invention the roof construction, which does not include separate roof trusses, comprises (a) a plurality of tile rafters (combining a tile and a rafter in one member), extending from eave to ridge and placed one beside another, opposite tile rafters abutting at the ridge or interlocking with separate ridge members, (b) eave members at both sides, to which the tile rafters are secured and which transmit the thrust, and (c) spaced ties across the eave members, the latter taking up as horizontal beams the thrust occurring between the ties, it being also possible to combine this construction with a solid floor in which case the eave members and ties form integral parts thereof. A known separate roof truss, consisting in its simplest form of two rafters and a tie, is thus replaced in a roof construction according to my invention by eave members, as longitudinal horizontal beams, and by spaced ties, a plurality of tile rafters, which serve as roof cover, representing at the same time the upper portion of the roof truss. Another distinction is given by the more economical section of the tile rafters. Beams of half-tubular sections, with the cavity upwards or downwards, for floors and flat roofs are known. However, full use cannot be made of this shape in constructions where an even upper surface is required, since either slabs must be provided over the cavities or the latter have to be filled. This is not necessary with tile rafters according to my invention, which represent a great improvement from the point of view of economy, due to the reduced surface area, as compared with e. g. channel-shaped roofing members, the valleys in the corrugated sloping surface allowing water to flow freely down the slope.

A tile rafter according to my invention, being of substantially half-tubular section and having only a part of its upper and lower portions flattened, represents therefore by itself a great improvement as compared with known art and may also be used as cover in roof constructions of relatively great dimensions in which purlins are provided between separate roof trusses, the sloping tile rafters extending between two purlins and being secured to them. In order to distinguish this novel combination of a tile (i. e. of a sloping element which is only a roof cover) and of a rafter (i. e. a sloping element, capable of carrying a load but not primarily used as a cover) from known tiles, fixed to battens or their substitutes, a minimum length of 10 feet has been assumed, by which minimum length it is intended to designate the main function of this novel construction as that of a rafter, simultaneously serving also as a tile.

As far as the production of such tile rafters is concerned, the method preferably used depends on the material from which said roofing members are formed. When brick, glass or plastics are used the usual methods for manufacturing such products may be employed. Where the material is concrete the manufacture is preferably carried out either by centrifugal molding or by vibrating. The manufacture of spun concrete products in centrifugal molding is known, also the production of two half tubes simultaneously. By employing this method use can be made of the great advantages of spun concrete products, i. e. great density and strength, guaranteed uniformity, smooth surface (thus ensuring impermeability) and economy in manufacture. It is, of course, also possible to provide in the solid floor a ceiling of increased insulating capacity. It is possible to use light weight aggregates and nevertheless to obtain sufficient strength. One proposition is to use only brick, ground and broken brick being used as fine and coarse aggregates respectively, in combination with cement, in which case the dead weight is reduced by a quarter. The advantage of the use of light weight concrete lies in the reduced weight and in an increase in the insulating capacity. It is, of course, also possible to fix separate insulating plates to the underside of the roofing members or to suspend them thereat in order to obtain an equivalent insulation as with traditional roofs where beside the roofing cover a separate boarding with a felt layer is provided.

The accompanying drawing shows methods of carrying my invention into practice.

Figure 1:
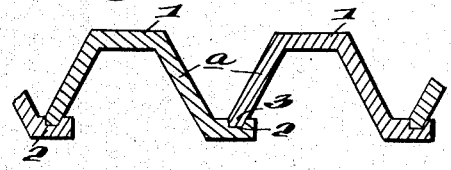
Figures 1 to 7 are sections through tile rafters according to this invention.

In Fig. 1, which is a section through a number of assembled tile rafters $a$, there is illustrated a trapezoid shape with an upper extended zone $1$ and a lower extended zone $2$ at one side of the trapezium, means $3$ being provided (e. g. by a groove) for interlocking.

Figure 2:
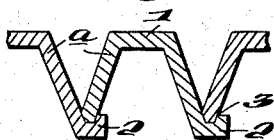
Figure 3:
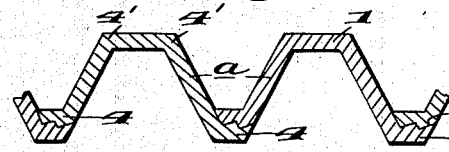

In Figs. 2 and 3 there are shown cross sections of alternative solutions similar to Fig. 1, wherein in Fig. 2 a groove $3$ is provided for interlocking whereas in Fig. 3 the interlocking $3$ is obtained by a tongue and groove connection, $4$ and $4'$ representing a steel reinforcement, assuming the material of the roofing members to be concrete.

Figure 4:
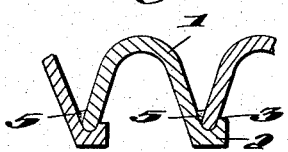
Figure 5:
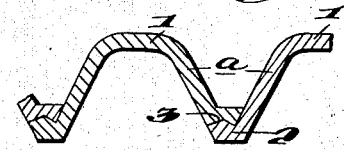

Figs. 4 and 5 are sections corresponding to Figures 2 and 3, but the tile rafters being curved instead of straight. It is possible and in some cases advisable to provide a filling $5$, as shown in Figure 4, between two adjacent tile rafters with a mortar or a bituminous material.

Figure 6:
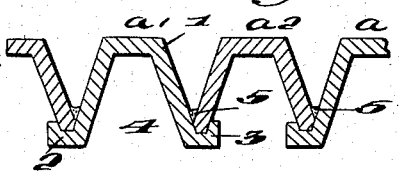

Figure 6 illustrates an arrangement, wherein the adjacent members $a_1$ and $a_2$ are of different section, the extensions $2$ being provided at both sides of each alternate member $a_1$, whereas the members $a_2$ are formed without such extensions, a separate reinforcement $4$ being preferably provided in order to increase the tensile resistance. It is, of course, also possible to provide the members $a_2$ with extensions at both sides, having corresponding interlocking parts as shown e. g. in Fig. 5. It is also possible to provide both members $a_1$ and $a_2$ of equal depth, in which case the members $a_2$ extend above the members $a_1$ and a staggered upper surface of the flattened portions of adjacent members occurs. It is, of course, possible to manufacture tile rafters according to this invention from any of the materials previously mentioned, viz. concrete, brick, glass or plastics. Where necessary a separate impermeable smooth layer has to be provided upon the outer surface, when this is not obtained by the manufacture of the said roofing members.

Figure 7:
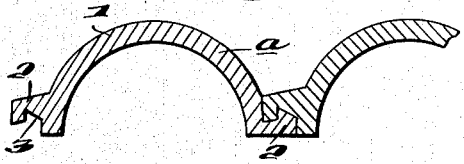
Figure 8:
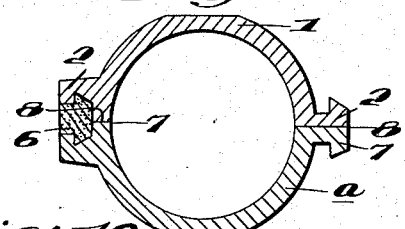
Fig. 8 is a cross section illustrating the production of two half-tubular tile rafters according to this invention, when centrifugal molding is employed.

Figure 7 shows a section through spun concrete tile rafters of substantially half-cylindrical shape, produced by centrifugal molding, and Figure 8 illustrates schematically the production of two half tubes. Fillets $6$ have to be inserted in addition to separating sheets $7$ in the joint axis $8$.

Figure 9:
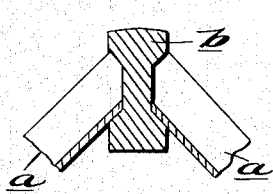
Fig. 9 is a fragmentary cross section through a roof, comprising the upper portion of a pitched roof showing the ridge member and parts of two roofing members interlocked therewith.
Figure 10:
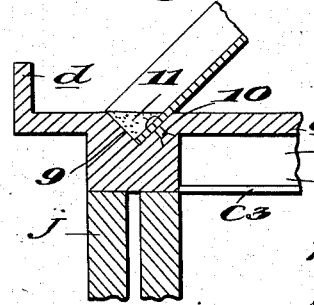
Figs. 10 and 11 are fragmentary cross sections through roofs, comprising an eave with the gutter and a part of the tile rafters.

In Figure 9 there is shown a ridge member $b$ preferably of I-shape with which the sloping tile rafters $a$ interlock. These ridge members may be provided in any convenient length. Figure 10 is a section through the eave in connection with a solid top floor construction $c$ (floor slab $c_1$, floor beam $c_2$, ceiling $c_3$) and eave members $c_e$ with a gutter $d$. In this floor at the eave members recesses $9$ are provided of such a size as to allow of a simple positioning and dismantling of the tile rafters $a$, which are fixed by screws or the like $10$ to the solid floor $c$, the recess $9$ being filled later with concrete or a bituminous material $11$. Replacement is simplified, when each second tile rafter overlaps the adjacent members, as e. g. shown in Fig. 6.

Figure 11:
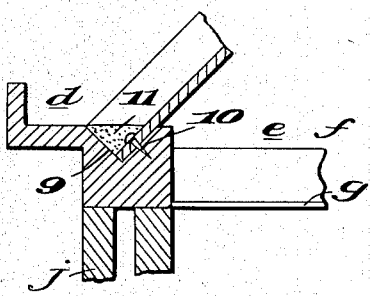

Figure 11 is an alternative solution with separate eave members e to which the tile rafters are secured supported by the wall $j_1$ and ties $f$, which may be rods, to be provided to take up the horizontal thrust, where no solid floor construction c is provided but only a ceiling g. The ties $f$ may be formed as solid beams and used as ceiling girders.

Figure 12:
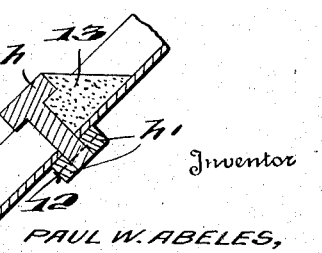
Fig. 12 is a fragmentary cross section through a roof, comprising an intermediate purlin with parts of the adjacent tile rafters interlocked therewith.

For roofs of extraordinary span a separate roof construction with purlins may be provided, the tile rafters being arranged between such purlins, the ridge and eave members. Figure 12 illustrates such an alternative embodiment with an intermediate purlin h of T-shape, having two parts $h_1$ secured thereto by means of bolts 12 so as to form an I-shape. In such a construction also two inclined ridge purlins of a similar shape are provided in order to allow the tile rafters to be dismantled and replaced by new members if necessary. The lower end of each tile rafter has to be filled with concrete or a bituminous material 13, as shown in Fig. 12, similar to the filling 11 at the eave.

Whereas I have illustrated and described my invention with reference to specific forms thereof, it is to be understood that many changes may be made within the scope of the following claims.

I claim:

1. A pitched roof construction comprising eave members, spaced tie members extending between and secured to opposite eave members, and a plurality of tile rafter members disposed one beside another, each such tile rafter extending from an eave member to the ridge of the roof and combining the functions of a tile and of a rafter, opposite tile rafters abutting at the ridge, the lower end of each tile rafter being secured and transmitting the thrust to an eave member, at least two tile rafters extending from the ridge to the eaves at each side between any two tie members, and the eave members acting as beams to take up the horizontal thrust between the tie members.

2. A pitched roof construction according to claim 1, wherein each two adjoining tile rafters are provided with interengaging parts.

3. A pitched roof construction according to claim 1, wherein the eave members receive the lower ends of the tile rafters, which are secured to said eave members.

4. A pitched roof construction according to claim 1, wherein separate ridge members are provided with which the said tile rafters interlock at either side thereof.

5. A pitched roof construction according to claim 1, wherein said eave members and ties form an integral part of a solid floor construction.

6. A pitched roof construction according to claim 1, wherein the said tie members are solid beams molded in reenforced concrete and serve as ceiling girders.

7. A pitched roof construction, having at least one sloping side, comprising (a) a plurality of tile rafters, each of which combines the functions of a tile and a rafter, molded from a plastic substance which may be steel reenforced, said tile rafters extending from eave to ridge, being of substantially half-tubular section and having only parts of their upper and lower portions flattened, adjacent parts being provided with overlapping means, and (b) spaced tie elements, at least two tile rafters being disposed between adjacent tie elements, and said tile rafters being secured at their ends against sideward displacement.

8. A pitched roof construction according to claim 7, wherein adjacent parts of the tile rafters overlap and include interlocking means.

9. A pitched roof construction comprising eave members, a ridge member, spaced tie members extending between and secured to opposite eave members, and a plurality of sloping tile rafters disposed one beside another and molded from a plastic substance which may be steel reenforced, each said tile rafter extending from an eave member to the ridge, wherein opposite tile rafters abut and interlock with the ridge member, each said tile rafter combining the functions of a tile and a rafter, being of substantially half-tubular section and having only a part of their upper and lower portions flattened, adjacent parts being provided with overlapping means, said tile rafters being of sufficient strength to bridge the slope between eave and ridge, means being provided for securing said tile rafters to the eave members, the thrust occurring in the tile rafters being safely transmitted to the eave members, said eave members, at each side of the pitched roof being molded from reenforced concrete as beams of sufficient strength to take up the horizontal thrust, occurring between the tie members, and being preferably provided with parts forming gutters.

10. A pitched roof construction according to claim 9, wherein separate ridge members are provided with which the tile rafters interlock at either side thereof.

11. A pitched roof construction according to claim 9, wherein the tie members are solid beams molded in reenforced concrete and serve as ceiling girders.

12. A pitched roof construction according to claim 9, wherein both eave members and tie members form an integral part of a solid floor.

13. In a pitched roof construction, a tile rafter which combines the functions of a tile and of a rafter, each tile rafter being molded from a plastic substance which may be steel reenforced and extending in the slope between horizontal members and being secured to said horizontal members, said tile rafter being of substantially half-tubular section and having only a part of its upper and lower portions flattened, adjacent parts being provided with overlapping means, and said tile rafter being of sufficient strength as to overbridge a span of at least 10 feet.

14. In a pitched roof construction, a tile rafter according to claim 13, adjacent parts of the said tile rafter being provided with interlocking means

PAUL WILLIAM ABELES.